United States Patent [19]

Bull

[11] 4,314,446

[45] Feb. 9, 1982

[54] EXHAUST SKIMMING

[75] Inventor: James E. Bull, Denton, Tex.

[73] Assignee: Texas Woods Instruments, Inc., Red Oak, Tex.

[21] Appl. No.: 79,175

[22] Filed: Sep. 26, 1979

[51] Int. Cl.³ .............................................. F02M 25/06
[52] U.S. Cl. ......................................... 60/279; 60/311
[58] Field of Search ............................ 60/278, 279, 311;
55/392, 394–396, 398, 443–445, DIG. 30

[56] References Cited

U.S. PATENT DOCUMENTS 1,240,081  9/1917  Moss ..................................... 55/445
4,114,370  9/1978  Woods .................................. 60/279

FOREIGN PATENT DOCUMENTS 2339065  8/1977  France .................................. 60/279

Primary Examiner—Louis J. Casaregola
Attorney, Agent, or Firm—Cushman, Darby & Cushman

[57] ABSTRACT

An exhaust gas treatment system and method, primarily for a motor vehicle having an internal combustion engine. An expansion chamber is connected in a straight line to a first straight line portion of an exhaust conduit from the engine, with a second portion of the exhaust conduit extending in a straight line from the expansion chamber. The expansion chamber has a cross-sectional area 110% to 200% as large as the cross-sectional area of the exhaust conduit. First and second series of openings are provided in the expansion chamber substantially 180° apart along the circumference of the expansion chamber, with the expansion chamber being mounted so that a plane containing the first and second series of openings is generally vertical. Pick-off conduits return carbon monoxide, hydrocarbon gases, and water vapors separated through the openings of the expansion chamber to the engine, the returning gases being filtered to at least remove the excess liquid therein. The excess liquid is vaporized, and the vapor is returned to the intake manifold of the engine, along with the hydrocarbon and/or carbon monoxide gases, which have a relative humidity of 60 to 100% wind return.

14 Claims, 3 Drawing Figures

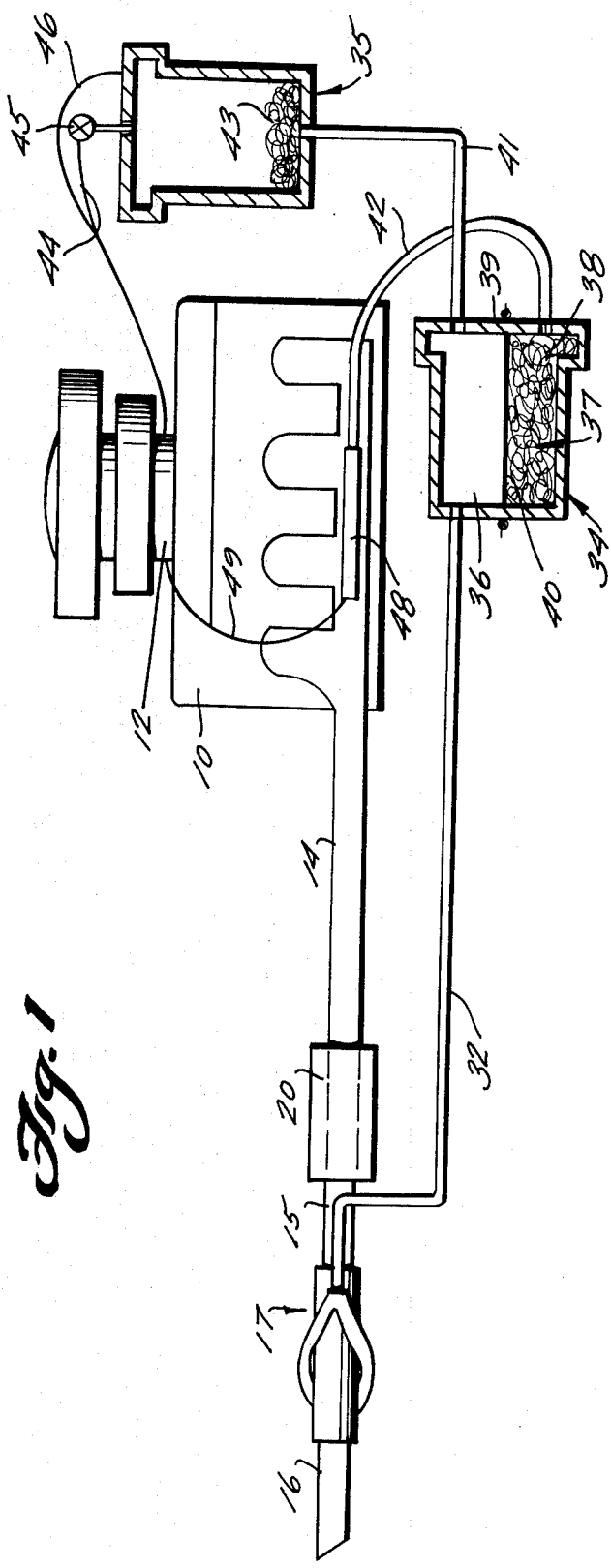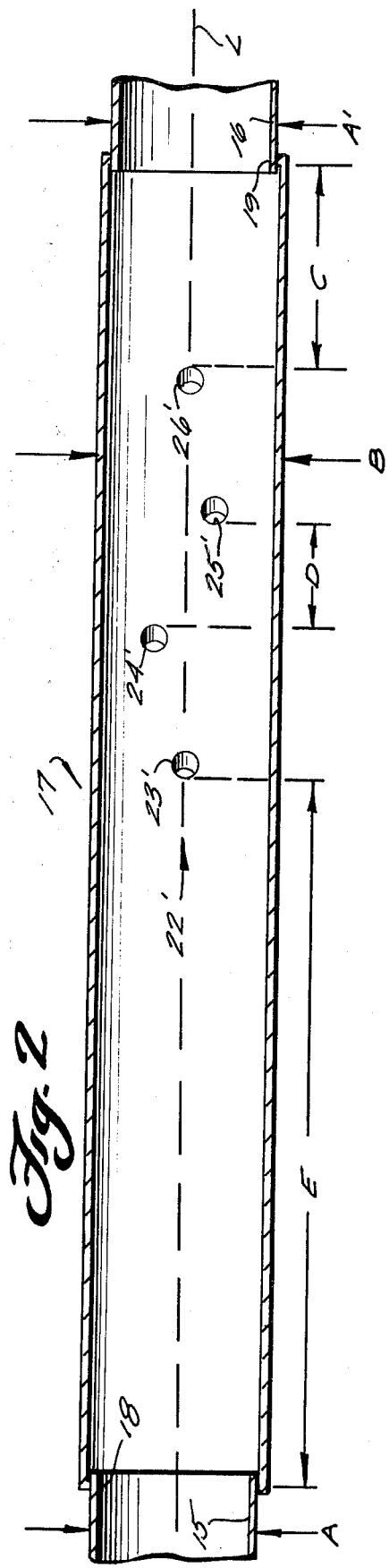

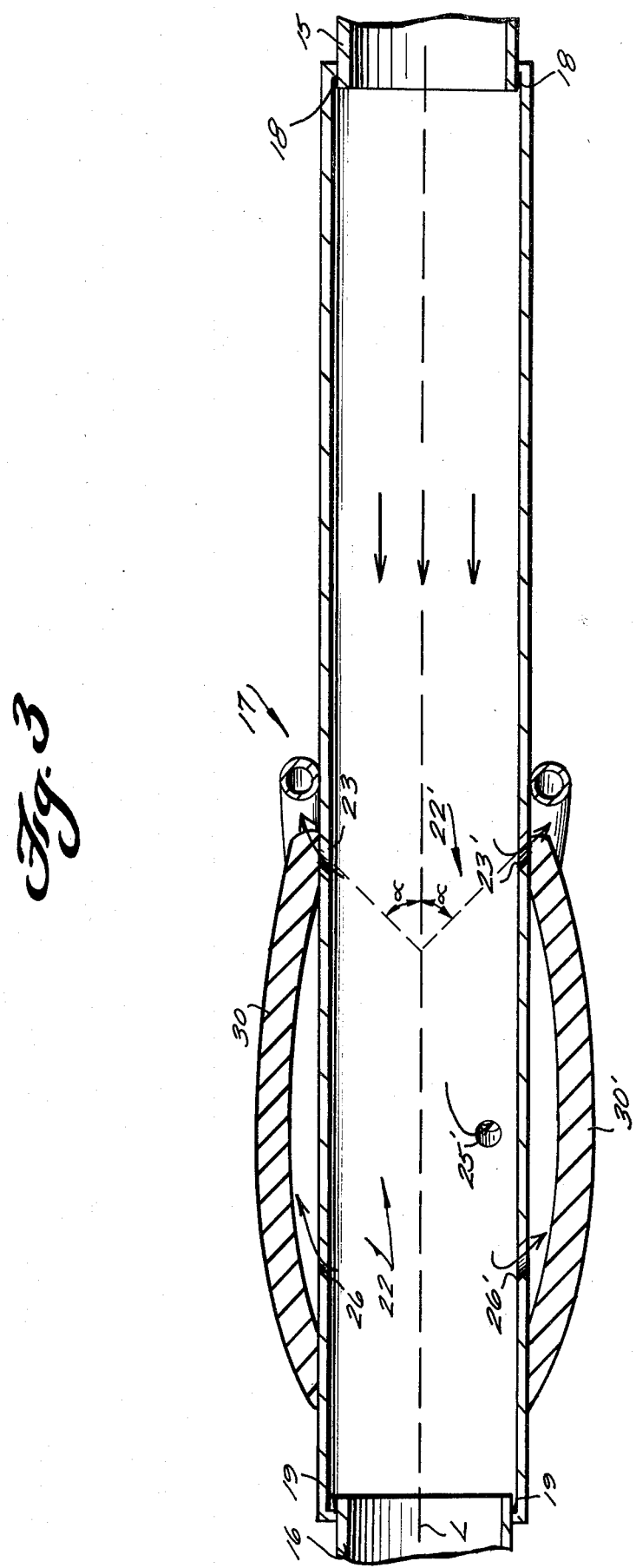

EXHAUST SKIMMING

BACKGROUND AND SUMMARY OF THE INVENTION

The invention relates to a system and a method for returning exhaust gases to a combustion chamber, primarily for use with a motor vehicle having an internal combustion engine. The primary purpose of returning the exhaust gases is to increase the fuel economy of, or decrease the pollutants emitted from, the combustion chamber.

An exemplary prior system for recirculating exhaust gases is disclosed in U.S. Pat. No. 4,114,370, which includes a system for separating out desirable gases, filtering the gases, and returning the filtered gases to the intake manifold of an internal combustion engine. Additionally, excess liquid may be vaporized in such a system and also returned to the engine.

While the system described in U.S. Pat. No. 4,114,370 is generally successful, there are a number of practical problems associated therewith, mostly related to problems of constucting the components. For instance, the skimmer is difficult to mass produce efficiently, and the installation of the skimmer with the U-shaped, square-cornered clarifier is time consuming. Also, with many internal combustion engines for motor vehicles the system produces excess liquid that must somehow be disposed of, otherwise the improved operation desired by employing this system may be somewhat diminished.

According to the present invention, a system and method are provided that eliminate most or all of the problems mentioned above. In particular, the system according to the present invention is simple to mass produce, installation time is much reduced (by as much as 300%), and excess liquid is not produced. In addition, the filters associated with the system according to the invention last longer and may be simply cleaned with soap and reused, rather than having to be entirely replaced as was often necessary in prior systems. Also, the system according to the invention is as effective as the prior systems for increasing fuel economy and/or decreasing pollutants.

An exemplary system according to the present invention comprises an exhaust conduit from a combustion chamber having a first portion disposed in a substantially straight line; an expansion chamber connected in a straight line with the exhaust conduit first portion at a first end thereof, and having a second end, opposite the firt end; and a second substantially straight line portion of the exhaust conduit connected in a straight line with the expansion chamber second end. The expansion chamber has a larger cross-sectional area than the exhaust conduit first or second portions (preferably 110% to 200% larger). Means are provided for defining a plurality of openings in the expansion chamber in first and second series, the first series disposed substantially 180° from the second series along the circumference of the expansion chamber. Means are provided for mounting the expansion chamber so that a plane containing the first and second series of openings in the expansion chamber is generally vertical. Pick off conduit means are operatively associated with the openings in the expansion chamber and for returning gases passing through the openings from the expansion chamber to the combustion chamber, filtering means being disposed in the conduit means between the expansion chamber and the combustion chamber for, at least, separating excess liquid out of the returning gases.

The openings in the expansion chamber are each disposed along a line making an acute angle with respect to a line concentric with the expansion chamber and leading from the first exhaust conduit portion to the second exhaust conduit portion. The means defining the plurality of openings preferably defines four openings in each series, comprising first, second, third and fourth openings. The first opening in each series is closest to the exhaust conduit first portion, with the second, third and fourth openings extending in order therefrom. The first and fourth openings are preferably disposed along a straight line substantially parallel to the straight line between the expansion chamber and the exhaust conduit first portion, and the second and third openings are disposed on opposite sides of that straight line between the first and fourth openings. The second and third openings do not overlap the first and fourth openings either in the dimension of the straight line or in a dimension perpendicular to the straight line. The second and third openings are disposed no more than 20° from the straight line along the circumference of the expansion chamber. In an exemplary system according to the present invention, for use with a 351 cubic inch Ford engine, the length of the expansion chamber from the first exhaust conduit to the first opening in series is 10.5 inches, the length from the fourth opening in each series to the second exhaust conduit is 3 inches, and there is a spacing of approximately 1½ inches between the openings along the dimension of the straight line, each opening having a diameter of about ⅜ to 5/16 inches.

The filtering means utilized in practicing the invention preferably comprise a first substantially horizontally disposed filter having a top gas containing portion, and a lower liquid separating portion, and a second substantially vertically disposed filter disposed vertically above the first filter and a conduit interconnecting the filters to allow excess liquid in the second filter to drain into the first filter. The first filter has a liquid conduit extending from the lower portion thereof through means for vaporizing the liquid therewithin to the engine intake manifold. The conduit interconnecting the filters extends from the first filter top portion to a bottom portion of the second filter, and another conduit extends from a top portion of the second filter to the intake manifold. The filters preferably are tubes made of aluminum, with aluminum mesh disposed in the lower portion of the first filter and a lower portion of the second filter.

An exemplary method of acting upon exhaust gases from an internal combustion engine having an intake manifold, and utilizing an exhaust conduit and a generally horizontally disposed expansion chamber, according to the present invention consists essentially of the following steps: (a) Passing the exhaust gas from the internal combustion engine through the exhaust conduit in a generally horizontal direction. (b) Generally transforming turbulent circular motion of gases within the exhaust conduit into a more linear pressure flow (as by passing the exhaust gases through a muffler connected in substantially a straight line with the expansion chamber). (c) In the expansion chamber, effecting separation of primarily hydrocarbon gases, carbon monoxide, and water vapor from the more linear pressure flow. (d) Collecting the separated gases and returning them toward the internal combustion engine. (e) Filtering the returning gases to, at least in part, separate out excess liquid. (f) Delivering hydrocarbon and/or carbon monoxide having a relative humidity of 60 to 100% to the intake manifold; and (g) vaporizing excess liquid separated from the returning gases and returning the vapor so formed to the intake manifold.

It is the primary object of the present invention to provide a simple to manufacture and install exhaust gas treatment system for a combustion chamber, and associated method, which can increase the fuel economy of and/or decrease the pollutants from, a combustion chamber. This and other objects of the invention will become clear from an inspection of the detailed description of the drawings, and from the appended claims.

BRIEF DESCRIPTION OF THE DRAWINGS

FIG. 1 is a diagrammatic view of a preferred exhaust gas treatment system for an internal combustion engine, according to the present invention;

FIG. 2 is a cross-sectional view taken along a horizontal plane, of the expansion chamber and associated structures of FIG. 1; and FIG. 3 is a cross-section view taken substantially along a vertical plane of the expansion chamber and associated structures of FIG. 1.

DETAILED DESCRIPTION OF THE DRAWINGS

The exhaust gas treatment system according to the present invention is preferably utilized with an internal combustion engine 10 in a motor vehicle, although it is also useful with combustion chambers in general. The engine 10 includes an intake manifold 12 and an exhaust system including an exhaust conduit 14. The exhaust conduit includes a first portion 15 disposed in substantially a straight line, and a second portion 16. An expansion chamber indicated generally at 17 is connected at a first, inlet end 18 thereof to the first exhaust conduit portion 15, and at the outlet, second end 19 thereof to the second exhaust conduit portion 16. The exhaust conduit 14 (including portions 15 and 16 thereof), and the expansion chamber 17 preferably are circular in cross-section with the cross-sectional area of the expansion chamber 17 being about 110 to 200% as large as the cross-sectional area of the first conduit portion 15, and at least 110% to 200% as large as the cross-sectional area of the second exhaust conduit portion 16.

A muffler 20 is disposed in the exhaust conduit, and is disposed in a straight line with the first exhaust conduit portion 15. Thus, preferably, a common straight line L (see FIGS. 2 and 3) extends from the muffler 20, through the first exhaust conduit portion 15, through the expansion chamber 17, and through the second exhaust conduit portion 16. The exhaust gases flowing in the conduit 14 have at least in part a turbulent circular motion, and the muffler 20, connected in a straight line relationship with the exhaust conduit portion 15, transforms the turbulent circular motion of the gases into a more linear pressure flow, so that the gases entering the expansion chamber 17 are flowing generally in a horizontal straight line.

When the exhaust gases enter the expansion chamber 17, there is a tendency for the hydrocarbon gases, carbon monoxide, water vapor, and perhaps other gases (such as carbon dioxide) to go to the top and the bottom of the horizontally disposed expansion chamber. Thus, means are provided for defining a plurality of openings in the expansion chamber in first and second series 22, 22′, with the first series 22 disposed substantially 180° from the second series 22′ along the circumference of the expansion chamber 17. Means are provided, such as tightenable clamps and brackets, for mounting the expansion chamber 17 so that a plane containing the first and second series of openings 22, 22′ is generally vertical, as illustrated in FIG. 1.

In a preferred system according to the present invention, the means for defining each of the series of openings defines four openings in each series including first, second, third, and fourth openings. In the first series 22 the first, second, third, and fourth openings are 23, 24, 25, and 26 respectively, while in the second series 22′ they are 23′, 24′, 25′, and 26′ respectively. Typically, the openings would be substantially circular and have the diameter of about ⅜ to 5/16 inches. With reference to FIG. 2, the first and fourth openings 23′, 26′ are disposed along a straight line substantially parallel to line L, and the second and third openings 24′, 25′ are disposed on opposite sides of that straight line between the first and fourth openings, and do not overlap the first and fourth openings 23′, 26′ in the dimension of the straight line (parallel to line L), or in a dimension perpendicular to that straight line. As can be seen with reference to FIGS. 2 and 3, the second and third openings 24′, 25′ are disposed no more than 20° from the straight line (parallel to the line L) along the circumference of the expansion chamber 17. With particular reference to FIG. 3, each of the openings 23 through 26 and 23′ through 26′ is disposed along a line that makes an acute angle with respect to the line L (which is concentric with the expansion chamber 17 and the exhaust conduit 14).

Although the exact dimensions of the expansion chamber, positioning of the openings, and relative dimensions of the expansion chamber and exhaust conduit portions 15, 16, will vary depending upon the circumstances, one exemplary system that is especially useful with a 351 cubic inch Ford engine is as follows (in particular see FIG. 2): The diameter A of the first exhaust conduit portion 15 is about 2½ inches and the diameter A′ of the second exhaust conduit portion 16 is about 2½ inches or less. Where it is desirable to have a higher back pressure, the diameter A′ is reduced with respect to the diameter of A (e.g. from 2½ inches to 2 inches). For instance, a 400 cubic inch Ford engine would have a conduit diameter A′ of 2 inches. The diameter B of the expansion chamber is greater than the diameters A or A′, and preferably B is ⅛ to 1 inch greater than the diameter of A. For example, the diameter B is 2¾ inches. The length of the expansion chamber 17 from the first end 18 thereof to the first opening (23, 23′) in each series is denoted by E in FIG. 2, and preferably this distance is about 10.5 inches. The distance from the second end 19 to the fourth opening (26, 26′) in each series, denoted by C is about 3 inches, and the spacing D, between each of the openings in each series along the dimension L, is about 1½ inches.

In general, the cross-sectional area of the expansion chamber 17 is about 110% to 200% as large as the cross-sectional area of the exhaust conduit 15, and at least 110% to 200% of the cross-sectional area of the second exhaust conduit portion 16.

The system according to the present invention also includes pick-off tubes 30, 30′ associated with the series of openings 22, 22′ respectively. Such pick-off tubes also are associated with conduit means such as the conduit 32, which return the gases collected by the pick-off tubes 30, 30′ to the intake manifold 12. Filtering means are disposed in the conduit 32 such as first and second filters 34, 35, for, at least, separating excess liquid out of the returning gases.

The first filter 34 of the filtering means is substantially horizontally disposed and has a top gas containing portion 36 thereof, and a lower, liquid separating portion 37. The filter 34 may comprise an aluminum tube about 8 to 10 inches long and having an inside diameter of approximately 3 inches, with aluminum mesh—indicated diagrammatically at 38 in FIG. 1—filling at least the bottom portion 37 thereof. The aluminum mesh can be the type conventionally used in air conditioning filter units (without plastic centers) the end 39 of the filter 34 may be made separable from the rest of the filter, and may be operatively connected thereto with a through-extending brass bolt 40 or the like, having spacers (e.g. one quarter inch spacers) disposed at either end thereof. First and second conduits 41, 42, extend from the top 36 and bottom 37 portions of the first filter 34.

The first conduit 41 is connected to a bottom portion of the second filter 35. The second filter 35 is substantially vertically disposed and is located vertically above the first filter 34 so that excess liquid from the second filter 35 may drain through the conduit 41 to the first filter 34. For instance, the second filter 35 may be mounted under the hood of a motor vehicle, with the first filter 34 mounted under the vehicle chasis. Aluminum mesh 43 or the like is also disposed in the bottom of the second filter 35. From a top portion of the second filter 35 a conduit 44 extends to the intake manifold 12 for conducting gases in the top of the second filter 35 to the intake manifold. A valve (such as a check valve) 45 preferably is disposed in the conduit 44, and another, backup, conduit 46 may be provided between the filter 35 and the intake manifold 12 in case the valve 45 becomes blocked. The filtering means 34, 35, ensure that the gas delivered to the intake manifold from the second filter 35, which comprises carbon monoxide and/or hydrocarbon and/or carbon dioxide gases, has a relative humidity of about 60 to 100%.

The second conduit 42 from the first filter 34 conducts liquid through a heat exchanger 48, and then through a conduit 49 to the intake manifold 12. The heat exchanger 48 is disposed in conjunction with the exhaust system 14, or the like, or a catalytic converter associated with a motor vehicle, and the structure 48 effects vaporization of the liquid conducted by the line 42. The motive force pulling liquid through the conduit 42 is the vacuum pull from the engine 10. The vaporized liquid in line 49 may be fed into the intake manifold 12 via the carburetor ventura, or a like structure.

The system described above is simple and easy to install, directly in line with the muffler 20 of a conventional vehicle. The filters will last for several thousand miles, and may be cleaned with soap and reused as desired. In utilizing the invention, as with the prior art system disclosed in U.S. Pat. No. 4,114,370, a high compression ratio is provided. Despite the high compression ratio, the engine can run on low octane fuel (e.g. 80 octane). The means for timing the spark plugs that may be associated with the engine 10 (such as a distributor, solid state ignition system, or the like) operate so that the spark timing is ultra-advanced. For instance, the spark timing may exceed 60° before top dead center when the engine is operating a wide open throttle and over 2,000 rpm.

The method of acting upon gases exhausting from an internal combustion engine 10, having an intake manifold 12, according to the present invention, utilizes the exhaust conduit 14 and the generally horizontally exposed expansion chamber 17. The method consists essentially of the following steps: (a) Passing the exhaust gas from the internal combustion engine 10 through the exhaust conduit 14 in a generally horizontal direction. The exhaust gases in the conduit 14 include a turbulent, circular motion. (b) Generally transforming turbulent circular motion of gases within the exhaust conduit 14 into a more linear pressure flow (indicated by the straight arrows in FIG. 3). This is preferably practiced by passing the exhaust gases through a muffler 20 connected in substantially a straight line with the expansion chamber 17, as via the exhaust conduit first portion 15. (c) In the expansion chamber 17, effecting separation of primarily hydrocarbon gases, carbon monoxide, water vapor, and perhaps other gases (such as carbon dioxide) from the more linear pressure flow. (d) Collecting the separated gases (in pick-off tubes 30, 30') and returning them toward the internal combustion engine 10 (via conduit 32). (e) Filtering the returning gases to, at least in part, separate out excess liquid (by passing the gases through first filter 34 and second filter 35). (f) Delivering (through conduit 44) hydrocarbon and/or carbon monoxide (and/or carbon dioxide) gases with a relative humidity of about 60 to 100% to the intake manifold 12; and (g) vaporizing excess liquid separated from the returning gases, by passing liquid drawn through conduit 42 by the vacuum of the engine 10 through the heat exchanger vaporizer 48, and returning the vapor so formed to the intake manifold 12 (via the conduit 49).

When the expansion chamber 17 is connected in place with the conduit portions 15, 16, it is originally disposed so that the pick-off tubes 30, 30' (and the series of openings 22, 22' associated therewith) are in an exactly vertical plane. Then, the expansion chamber 17 is rotated counterclockwise or clockwise to obtain maximum hydrocarbon and carbon monoxide recovery. This is determined by performing the rotation while the engine 10 is running, and hooking up the conduit 32 (e.g. at a junction before filter 34) to a nondesbursive infra-red instrument (such as an EPA-75 MANUF. SWN). Typically, this rotation about the line L will not be more than a few degrees, so that the series 22, 22' are still essentially in a common vertical plane after adjustment. Then the chamber 17 is affixed in place as by attaching it with clamps and brackets or the like, or by welding it at its ends 18 and 19 to the exhaust conduit portions 15, 16.

Thus, it will be seen that according to the present invention an easy to manufacture and simple to install exhaust gas treatment system, with few, and simple components, has been provided, for increasing the fuel economy of and/or reducing the pollutants emitted from a combustion chamber; as well as a simple method for acting upon gases exhausting from a combustion chamber. While the invention has been herein shown and described in what is presently conceived to the most practical and preferred embodiments thereof, it will be apparent to those of ordinary skill in the art that many modifications may be made thereof within the scope of the invention, which scope is to be accorded the broadest interpretation of the appended claims so as to encompass all equivalent systems and methods.

What is claimed is:

1. An exhaust gas treatment system for a combustion chamber, comprising an exhaust conduit from a combustion chamber, having a first portion disposed in substantially a straight line;

an expansion chamber connected in a straight line with said exhaust conduit first portion, at a first end thereof, and having a second end, opposite said first end;

a second substantially straight line portion of said exhaust conduit, connected in a straight line with said expansion chamber second end;

said expansion chamber having a cross-sectional area 110% to 200% as large as the cross-sectional area of said exhaust conduit first portion, and at least 110% to 200% of the cross-sectional area of said exhaust conduit second portion;

means for defining a plurality of openings in said expansion chamber in first and second series, the first series disposed substantially 180° from the second series along the circumference of said expansion chamber;

means for mounting said expansion chamber so that a plane containing said first and second series of openings in said expansion chamber is generally vertical;

pick-off conduit means operatively associated with said openings in said expansion chamber and for returning gases passing through said openings from said expansion chamber to said combustion chamber; and filtering means disposed in said conduit means between said expansion chamber and combustion chamber for, at least, separating excess liquid out of the returning gases.

2. An exhaust gas treatment system for a combustion chamber, comprising an exhaust conduit from a combustion chamber, having a first portion disposed in substantially a straight line;

an expansion chamber connected in a straight line with said exhaust conduit first portion, at a first end thereof, and having a second end, opposite said first end;

a second substantially straight line portion of said exhaust conduit, connected in a straight line with said expansion chamber second end;

said expansion chamber having a larger cross-sectional area than said exhaust conduit first or second portions;

means for defining a plurality of openings in said expansion chamber in first and second series, the first series disposed substantially 180° from the second series along the circumference of said expansion chamber said means for defining said plurality of openings in said expansion chamber defining said openings so that each is disposed along a line making an acute angle with respect to a line concentric with said expansion chamber and leading from said first exhaust conduit portion to said second exhaust conduit portion, defining four openings in each series, comprising first, second, third, and fourth openings in each series; said first opening in each series is closest said exhaust conduit first portion, and said second, third, and fourth openings extend in order therefrom; said first and fourth openings are disposed along a straight line substantially parallel to said straight line between said expansion chamber and said exhaust conduit first portion; said second and third openings are disposed on opposite sides of said straight line between said first and fourth openings, and do not overlap said first and fourth openings either in the dimension of said straight line, or in a dimension perpendicular to said straight line; and said second and third openings being disposed no more than 20° from the straight line along the circumference of said expansion chamber;

means for mounting said expansion chamber so that a plane containing said first and second series of openings in said expansion chamber is generally vertical;

pick-off conduit means operatively associated with said openings in said expansion chamber and for returning gases passing through said openings from said expansion chamber to said combustion chamber; and filtering means disposed in said conduit means between said expansion chamber and combustion chamber for, at least, separating excess liquid out of the returning gases.

3. An exhaust gas treatment system for a combustion chamber, comprising an exhaust conduit from a combustion chamber, having a first portion disposed in substantially a straight line;

an expansion chamber connected in a straight line with said exhaust conduit first portion, at a first end thereof, and having a second end, opposite said first end;

a second substantially straight line portion of said exhaust conduit, connected in a straight line with said expansion chamber second end;

said expansion chamber having a larger cross-sectional area then said exhaust conduit first or second portions;

means for defining a plurality of openings in said expansion chamber in first and second series, the first series disposed substantially 180° from the second series along the circumference of said expansion chamber;

means for mounting said expansion chamber so that a plane containing said first and second series of openings in said expansion chamber is generally vertical;

pick-off conduit means operatively associated with said openings in said expansion chamber and for returning gases passing through said openings from said expansion chamber to said combustion chamber;

filtering means disposed in said conduit means between said expansion chamber and combustion chamber for, at least, separating excess liquid out of the returning gases; and said exhaust conduit and said expansion chamber being substantially circular in cross-section, with said exhaust conduit first portion having a diameter of about $2\frac{1}{2}$ inches, and said exhaust conduit second portion having a diameter of about $2\frac{1}{2}$ inches or less, and with said expansion chamber having a diameter about $\frac{1}{8}$ inch to 1 inch greater than the diameter of said exhaust conduit first portion.

4. An exhaust gas treatment system for a combustion chamber, comprising an exhaust conduit from a combustion chamber, having a first portion disposed in substantially a straight line;

an expansion chamber connected in a straight line with said exhaust conduit first portion, and a first end thereof, and having a second end, opposite said first end;

a second substantially straight line portion of said exhaust conduit, connected in a straight line with said expansion chamber second end;

said expansion chamber having a larger cross-sectional area than said exhaust conduit first or second portions;

means for defining a plurality of openings in said expansion chamber in first and second series, the first series disposed substantially 180° from the second series along the circumference of said expansion chamber;

means for mounting said expansion chamber so that a plane containing said first and second series of openings in said expansion chamber is generally vertical;

pick-off conduit means operatively associated with said openings in said expansion chamber and for returning gases passing through said openings from said expansion chamber to said combustion chamber; and filtering means disposed in said conduit means between said expansion chamber and combustion chamber for, at least, separating excess liquid out of the returning gases; said filtering means comprising a first substantially horizontally disposed filter having a top gas containing portion, and a lower liquid separating portion; and a second substantially vertically disposed filter disposed vertically above said first filter and a conduit means interconnecting said filters to allow excess liquid in said second filter to drain into said first filter.

5. A system as recited in claim 1 wherein said means for defining said plurality of openings in said expansion chamber defines said openings so that each is disposed along a line making an acute angle with respect to a line concentric with said expansion chamber and leading from said first exhaust conduit portion to said second exhaust conduit portion.

6. A system as recited in claim 5 wherein said means for defining said plurality of openings defines four openings in each series, comprising first, second, third, and fourth openings in each series; said first opening in each series is closest said exhaust conduit first portion, and said second, third, and fourth openings extend in order therefrom; said first and fourth openings are disposed along a straight line substantially parallel to said straight line between said expansion chamber and said exhaust conduit first portion; said second and third openings are disposed on opposite sides of said straight line between said first and fourth openings, and do not overlap said first and fourth openings either in the dimension of said straight line, or in a dimension perpendicular to said straight line; and said second and third openings being disposed no more than 20° from the straight line along the circumference of said expansion chamber.

7. A system as recited in claim 2 wherein said expansion chamber is approximately 10.5 inches long from said first exhaust conduit portion to said first opening in each series, and about 3 inches long from said fourth opening in each series to said second exhaust conduit portion, and wherein there is a spacing of approximately 1½ inches between openings along the dimension of said straight line.

8. A system as recited in claim 7 wherein each of said openings is substantially circular and has a diameter of about ⅜ to 5/16 inches.

9. A system as recited in claim 1 wherein the combustion chamber is an internal combustion engine of a motor vehicle, and wherein said exhaust conduit includes a muffler connected in straight line relationship with said exhaust conduit first portion.

10. A system as recited in claims 1, 7 or 9 wherein said exhaust conduit and said expansion chamber are substantially circular in cross-section, and wherein said exhaust conduit first portion has a diameter of about 2½ inches, and said exhaust conduit second portion has a diameter of about 2½ inches or less, and wherein said expansion chamber has a diameter about ⅜ inch to 1 inch greater than the diameter of said exhaust conduit first portion.

11. A system as recited in claim 1 wherein said filtering means comprises a first substantially horizontally disposed filter having a top gas containing portion, and a lower liquid separating portion; and a second substantially vertically disposed filter disposed vertically above said first filter and a conduit means interconnecting said filters to allow excess liquid in said second filter to drain into said first filter.

12. A system as recited in claim 4 wherein the combustion source comprises an internal combustion engine, having an intake manifold; and wherein said first filter has a liquid conduit extending from the lower portion thereof through means for vaporizing liquid therewithin, to the intake manifold; and wherein said conduit means interconnecting said filters extends from said first filter top portion to a bottom portion of said second filter; and a conduit extending from a top portion of said second filter to the intake manifold.

13. A system as recited in claim 12 wherein said conduit extending from said second filter to the intake manifold has a valve disposed therein, and further comprising another backup conduit extending from a top portion of said second filter to the intake manifold.

14. A system as recited in claim 12 wherein said first filter comprises aluminum mesh disposed in the lower portion thereof, and wherein said second filter comprises aluminum mesh disposed in a lower portion thereof.

* * * * *